March 11, 1941.  W. H. EDMUNDS  2,234,336
EXTINCTION TYPE EXPOSURE METER
Filed April 11, 1939

Inventor:
William H. Edmunds
By Martin E. Anderson
Attorney

Patented Mar. 11, 1941

2,234,336

UNITED STATES PATENT OFFICE 2,234,336

EXTINCTION TYPE EXPOSURE METER

William H. Edmunds, Denver, Colo.

Application April 11, 1939, Serial No. 267,288

4 Claims. (Cl. 88—23)

This invention relates to improvements in extinction type exposure meters and has reference more particularly to a device for determining the intensity of illumination of an object to be photographed and by means of which the proper setting of the stops and the timing of the shutter can be determined for films or plates of different emulsion speeds, varying light conditions and other variable factors which may enter into photography.

It is an object of this invention to produce a simple and practical exposure meter that can be constructed at a comparatively small cost and which will be efficient, reliable and of small size.

Another object is to produce a device of this type that will integrate the light from the entire area to be photographed so as to determine the average light effect.

Another object is to produce a device of the type indicated that can be easily operated and read.

A further object is to provide an instrument of the type referred to which can be permanently adjusted for the emulsion speed of the film or plate employed and in which the proper setting of the camera can be determined directly by moving a single scale element, namely, one that brings the "F" numbers into alignment with a scale indicating shutter speeds or frames per second corresponding thereto for the light conditions prevailing.

A further object of this invention is to produce a device of this type in which the area from which the light is reflected corresponds substantially with the area to be photographed so as to get the average light value for the subject of the photograph.

The above and any other objects that may become apparent as this description proceeds are attained by means of a construction and an arrangement of parts that will now be described in detail and for this purpose reference will be had to the accompanying drawing in which the invention has been illustrated, and in which.

Figure 1:
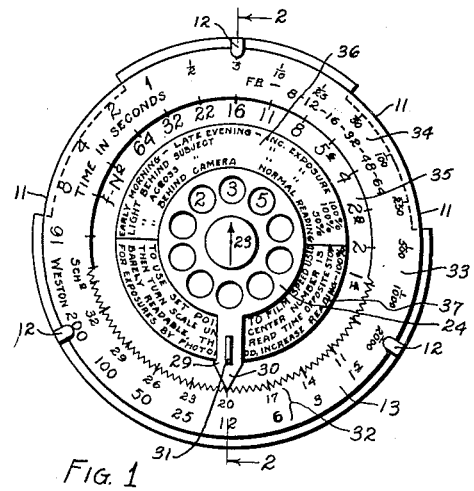
Figure 1 is a front elevation of an exposure meter constructed in accordance with this invention.

In the drawing reference numeral 10 designates a base member which is preferably formed from sheet metal, but may be formed from some plastic material, such as Celluloid, which is merely mentioned as a representative of a class of materials. In the form illustrated the base is substantially circular and has two sectors 11 removed as indicated in the drawing. The edge of the base is provided with spaced tongues 12 that project upwardly and are bent inwardly over the outer edge of ring 13, so as to hold the latter in concentric relation on the base, permitting it to rotate thereon. The base 10 is provided with a center opening 14 in which is positioned a body member 15 of some suitable material such as hard rubber, "Bakelite" or metal. The particular material of which this member is made does not affect the operation of the device. In the form illustrated in Figures 1 and 2, member 15 is provided with a central opening 16 which has countersunk area 17 at the rear. The outer edge of the member is provided with a rabbet 18 into which the wall around opening 14 fits. A plate 19 is positioned over the front surface of base 10 so as to overlap the base adjacent the opening and is provided with an opening that registers with opening 16. A clamping bolt 20 is formed with two concentric cylindrical sections 21 and 22, the one indicated by reference numeral 21 being of larger diameter than the one designated by numeral 22 so as to form a shoulder which engages the outer surface of plate 19 in the manner shown in Figure 2. Bolt 20 is provided with an enlarged head 23 which serves to hold a movable disk 24 in place thereon. Disk 24 is not clamped with any force against plate 19 but is so mounted that it can rotate about the cylindrical section 21. Between plate 24 and plate 19, a photographic screen 25 has been positioned. This screen is secured to the inner surface of member 24 so as to be rotatable therewith and in common with other photographic screens or wedges employed for a similar purpose, and has areas that differ in light transmitting properties and these areas vary from those that are almost transparent to areas that are almost opaque. When the movable member 24 is rotated, areas of different light transmitting properties are successively brought into position in front of openings 26, of which three are provided in member 15. A condensing lens 27 is positioned in each opening and plate 24 is provided with a plurality of openings 28 that can be successively brought into register with openings 26. Removable member 24 is also provided with a pointer or indicator 29 that terminates in a point 30. A ring 31 is attached to the pointer 29 and serves as a means for bending the pointer when the movable member 24 is to be adjusted with respect to ring 13. From Figure 1 it will be seen that ring 13 has its inner edges serrated for a distance of almost 180 degrees, the remaining inner edge being smooth and circular. Ring 13 carries a scale that is concentric with the edges thereof and extends along the serrated portion as shown in Figure 1. This scale is composed of two sets of figures, one row being marked "SCH°", which abbreviation represents the word "Scheiner" which is a certain system of photographic speed rating originating in Europe and having considerable use in the United States. The outer scale is identified by the name "Weston" which represents a system of photographic film speed rating which originated in the United States and is used extensively both here and abroad. These scales comprise different numbers arranged in angularly spaced relation and these numbers designate the speed of the emulsion employed in different grades of films or plates classified according to the systems named. These two scales have been designated by reference numeral 32 and will be referred to as emulsion speed scales. Ring 13 is also provided with a scale 33 that indicates time of exposure in seconds and fractions of a second and concentric with this scale is another scale 34 headed "FR" which indicates frames per second, and is used when moving picture cameras are employed. The base member 10 is provided with a scale 35 that represents the "F" numbers which designate the iris diaphragm openings in the lens.

Base 10 is also provided with a table 36 which is arranged concentrically and extends through an angle of 180 degrees. This table shows modifications of the readings for different conditions of light and the complementary zone is provided with instructions 37 that explain the manner in which the device is used.

Figure 2:
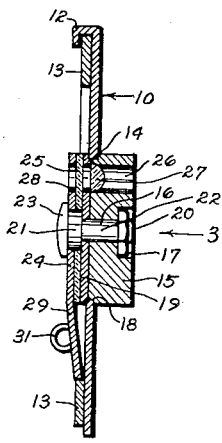
Figure 2 is a section taken on line 2—2, Figure 1.
Figures 3, 6:
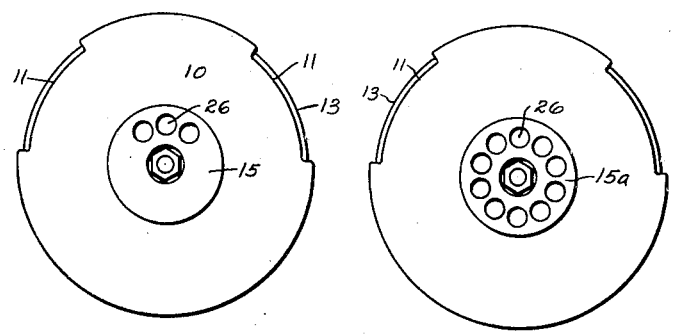
Figure 3 is a rear elevation looking in the direction of arrow 3, in Figure 2.
Figure 6 is a rear elevation looking in the direction of arrow 6, in Figure 5.

Let us now assume that an instrument like that shown in Figures 1, 2 and 3 is in the possession of a photographer and that he desires to determine the proper setting of his camera for the conditions of light prevailing. The pointer 29 is first adjusted with respect to the ring 13 so as to indicate the emulsion speed of the particular film or plate employed. In Figure 1 this speed indicates 20 on the Scheiner scale and 12 on the Weston scale. After this adjustment has been made it does not have to be changed so long as plates or films having this particular emulsion speed are used. After the pointer has been set in the proper serration the device is then pointed towards the scene whose light reflecting properties are to be measured and while so held the movable ring 13 is rotated. The rotation of ring 13 causes the disk 24 and its attached photometric screen 25 to rotate about the axis of clamping bolt 20. The rotation of the photometric screen brings into position between the observer and the condenser 27 areas of different light transparencies and when an adjustment is effected in which the numbers 2, 3 and 5, which are on the flat surfaces of the condenser lenses, will be so affected that number 2 can be read quite easily, number 5 is completely extinguished and number 3 is barely visible, then the parts have attained proper adjustment and the setting of the instrument is complete. After this measurement has been taken, the photographer consults scales 33 and 35 from which the speed of the shutter for any stop opening that he desires to use can be readily determined. In the example illustrated, if the light is poor and a sharp picture is desired, the photographer may decide to use a stop opening F22 and must then make an exposure of one-half second, which requires the camera to be supported on a tripod, or other stationary support. If, on the other hand, the camera is provided with a very fast lens, as, for example, an F2 lens, then the shutter speed corresponding to this will be one five-hundredths of a second. If a moving picture camera is employed, the frames per second as shown in scale 34 are used instead of the numbers in scale 33 and the iris diaphragm is adjusted to the F number corresponding to the speed at which the pictures are taken.

By referring to table 36 the necessary modifications for light conditions can be determined and suitable corrections made. If light filters are employed, it is possible to adjust the parts so as to correct for the effect of such filters.

It will be observed that member 15 is quite thick and that openings 26 are cylindrical. The thickness of member 15 limits the field of view or the area from which the reflected light is obtained to substantially that which will be covered by photographic lens of ordinary angle. This is important because if areas outside of that to be photographed are included, they may affect the readings to such an extent as to make them inaccurate.

Figure 4:
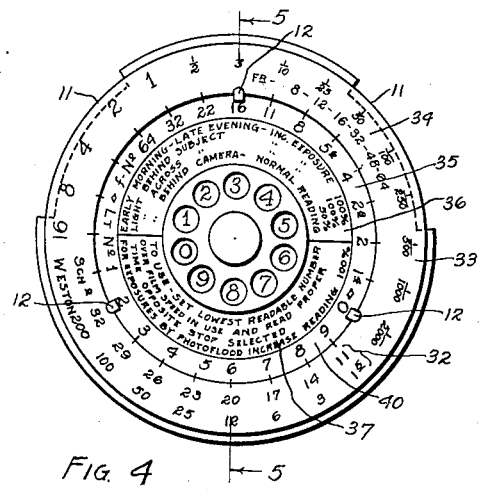
Figure 4 is a front elevation showing a slightly modified form of construction.
Figure 5:
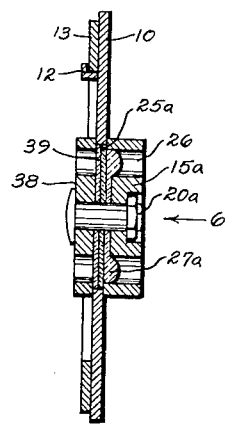
Figure 5 is a section taken on line 5—5, Figure 4.

The device illustrated in Figures 1, 2 and 3 is provided with three set openings 26 and the photometric film is movable in front of these openings. In Figures 4, 5 and 6 a slightly modified form of apparatus has been shown. The principal difference between the two forms is that in the form illustrated in Figures 4 and 5, the movable disk 24 with its attached photometric screen has been replaced by a stationary member 38 which is secured to the body member 15a by means of a bolt 20a which differs from that shown in Figure 2 by the omission of the enlarged cylindrical part 21. The condenser lenses 27a are integrally connected and member 15a instead of having only three openings 26, is provided with ten openings uniformly spaced in circular arrangement around the axis of bolt 20a. The photometric screen 25a is held stationary between members 15a and 38 and in the embodiment shown a transparent cover plate 39 is superimposed on the photometric screen. Numbers from zero to 9 are printed onto the plate 39 so as to be visible when viewed against a light source of suitable intensity. The transparency of the photometric screen changes from opening to opening usually by doubles so that the screen in front of opening 1 will admit twice as much light as the screen in opening 2. In this embodiment ring 13 is employed as in the other form and is provided with corresponding scales which has been designated by the same reference numerals. In this embodiment the ring is secured to the base by fingers 12 that overlap the inside edge of the ring and these serve the same function as the corresponding elements in Figure 1. In this embodiment the base is provided with an additional scale which has been designated by reference numeral 40 and which extends through an angle of slightly less than 180 degrees. This scale comprises numbers 1 to 10 in succession and correspond to the numbers in the sight opening. When this device is employed, it is held in such a position that the object or the area to be photographed is viewed through the sight openings and the observer notes the number in the openings that can be barely read, the number on one side being quite distinct and the number on the other side being invisible. In the adjustment shown in Figure 4 it will be assumed that the number 6 is the highest number that can be read by the light prevailing. If a plate or film corresponding to Scheiner 20 or Weston 12 is employed the ring is adjusted so as to bring these numbers into register with number 6 on scale 40. The proper stops and speed can now be readily determined by an inspection of scales 33 and 35 in the manner described in connection with the embodiment illustrated in Figures 1 and 2.

The embodiment just described is somewhat simpler in construction and can be made at less cost than the one shown in Figures 1 and 2, although the results obtained are substantially identical.

Attention is called to the fact that all the scales lie in a plane that is perpendicular to the optical axis of the instrument and an instrument of this kind is thin and can readily be carried in a vest pocket or in a case provided therefor which takes up very little room.

Attention is called to the fact that with the embodiment shown in Figures 1 and 2 one set opening is theoretically sufficient to obtain the desired results, but by employing three, a check can be had because by comparing the appearance of the numbers on both sides of opening 3, and adjusting the parts so as to extinguish number 5 while leaving number 2 visible and number 3 just barely visible, a more accurate adjustment can be had. The condensers can also be omitted, but they are preferable as they serve to greatly condense an increasing amount of light which facilitates the operation of obtaining a correct setting.

It will be observed from the above description and from the drawing that this device is so constructed that all of the scales are in planes perpendicular to the optical axis of the photometer and surround the latter so that the photometer, the scene whose light reflecting properties are to be measured and all of the scales can be held in undisturbed vision during operation. The photometer or integrator can be held at such a position that the scales can be read so that the eye will not have to accommodate itself when changing from one to the other.

The flat extended type illustrated acts as a shield and prevents the eyes from including any of the adjacent scenes which would affect the average values.

Attention is directed to the condenser lenses 27 positioned in openings 26. Such lenses serve to improve the illumination and to limit the field of vision, and to thereby effect a more accurate integration of the reflected light to be measured.

Having described the invention what is claimed as new is:

1. In an instrument of the character described, a base having a plurality of sight openings arranged in angularly spaced relation at equal distances from a center point, a plate movable about the center point and provided with openings spaced and positioned to register with the openings in the base, a photometric wedge carried by the movable plate, portions of said wedge of progressively different transparencies being brought into position in the sight openings when the movable plate is rotated relative to the base, a ring rotatably attached to the base, in concentric position relative to the movable member, said ring having a scale indicating emulsion speeds, and means for interconnecting the ring and the movable member for simultaneous rotary movement, the ring and base having cooperating scales indicating stops and shutter speeds.

2. An extinction type photometer for use in photography, comprising a flat base member of sheet material, a member movably attached thereto for rotation about a center pivot, a plurality of scales on the surface of the base, arranged concentrically about the pivot, the base having a plurality of openings whose axes are perpendicular thereto, a photographic screen secured to the movable member so as to be brought successively into position over the openings, successive areas of said screen having different light transmitting properties, an annular scale movably attached to the base for concentric rotation about the pivot point, interlocking means between the movable member and the annular scale member, the latter having a scale indicating emulsion speeds, and the movable member having a pointer forming one part of the interlocking means whereby the two members can be relatively positioned for emulsion speed and rotated about the pivot as a unit, the base and the annular member having each a scale that cooperates with a corresponding scale on the other, one of the scales indicating the stop values and the other the corresponding shutter speeds for the prevailing light conditions.

3. An extinction type photometer for use in photography, comprising a flat base member of sheet material, a member movably attached thereto for rotation about a center pivot, a plurality of scales on the surface of the base, arranged concentrically about the pivot, the base having a plurality of openings whose axes are perpendicular thereto, a photographic screen secured to the movable member so as to be brought successively into position over the openings, successive areas of said screen having different light transmitting properties, an annular scale member movably attached to the base for concentric rotation about the pivot point, interlocking means between the movable member and the annular scale member, the latter having a scale indicating emulsion speeds, and the movable member having a pointer forming one part of the interlocking means whereby the two members can be relatively positioned for emulsion speed and rotated about the pivot as a unit, the base and the annular member having each a scale that cooperates with a corresponding scale on the other, one of the scales indicating the stop values and the other the corresponding shutter speeds for the prevailing light conditions, the base member having also a table giving modifications of reading values as affected by the direction and kind of light.

4. An extinction type exposure meter comprising a base member having a plane surface on which is printed a plurality of scales, a member having a sight opening of greater length than diameter, said opening constituting the optical axis, a member movable with respect to the base, said movable member comprising a ring, the base and the movable member having cooperating scales indicating shutter speeds and iris diaphragm openings, the ring having a scale indicating emulsion speeds, means for determining the light intensity of the object to be photographed, means for determining the rotatable position of the ring and the base which corresponds to the light intensity and emulsion speeds, whereby the ring can be positioned in such relation to the base that the above mentioned scales representing shutter speed and diaphragm opening will be so positioned as to indicate the proper shutter speed and diaphragm opening corresponding to the light intensity of the subject photographed.

WILLIAM H. EDMUNDS.